United States Patent [19]

Martelet

[11] 4,019,171
[45] Apr. 19, 1977

[54] SAFETY LIGHTING SYSTEM

[75] Inventor: Ronald G. Martelet, River Forest, Ill.

[73] Assignee: Sears, Roebuck and Co., Chicago, Ill.

[22] Filed: Dec. 16, 1974

[21] Appl. No.: 532,917

[52] U.S. Cl. .................................. 340/134; 340/72;
240/7.55; 200/61.12; 335/207
[51] Int. Cl.² ........................................... B62J 5/00
[58] Field of Search ............. 340/134, 131, 62, 72;
240/7.55, 7.6; 200/61.12, 61.36, 61.85 M,
61.57; 335/202, 204, 205, 206, 207, 60, 89,
113; 73/514, 516 R, 517 R, 517 A, 518, 519;
116/56, 57, 35 R, 37, 28; 324/163, 167, 166

[56] References Cited
UNITED STATES PATENTS

| | | | |
|---|---|---|---|
| 2,630,480 | 3/1953 | Johnson et al. | 340/134 |
| 2,661,406 | 12/1953 | Callan | 340/134 |
| 3,519,987 | 7/1970 | Jania | 340/72 |
| 3,691,525 | 9/1972 | McClellan et al. | 340/62 |
| 3,792,307 | 2/1974 | Baker | 240/7.6 |
| 3,877,004 | 4/1975 | Okada et al. | 340/263 |
| 3,894,281 | 7/1975 | Bloomfield | 315/88 |
| 3,898,563 | 8/1975 | Erisman | 324/166 |

FOREIGN PATENTS OR APPLICATIONS 686,844   2/1953   United Kingdom ............... 240/7.6

*Primary Examiner*—John W. Caldwell
*Assistant Examiner*—Donnie L. Crosland
*Attorney, Agent, or Firm*—Arnstein, Gluck, Weitzenfeld & Minow

[57] ABSTRACT

A velocity responsive lighting system for a vehicle provides a plurality of warning light means which are periodically illuminated in sequence for a period determined by the velocity of the vehicle. The system includes a plurality of magnetically responsive switch means and a plurality of magnetic field generating means, one of the pluralities being mounted on a rotatable member of the vehicle and the other being mounted adjacent thereto so that upon rotation of the member each of the plurality of magnetic field generating means is placed within the vicinity of one of the magnetically responsive switch means to cause the latter to be energized and thereby periodically energize each of the light means in sequence for a period determined by the velocity of the rotatable member. The system can further include battery means or electrical current generating means, or both with circuit means for alternatively switching therebetween, for energizing the light means. In the preferred embodiment, the vehicle is a cycle and the rotatable member is a spoked wheel on which the plurality of magnetic field generating means are mounted on spokes of the wheel to pass within the proximity of the magnetically responsive switch means mounted on a supporting member adjacent the spokes of the wheel.

1 Claim, 9 Drawing Figures

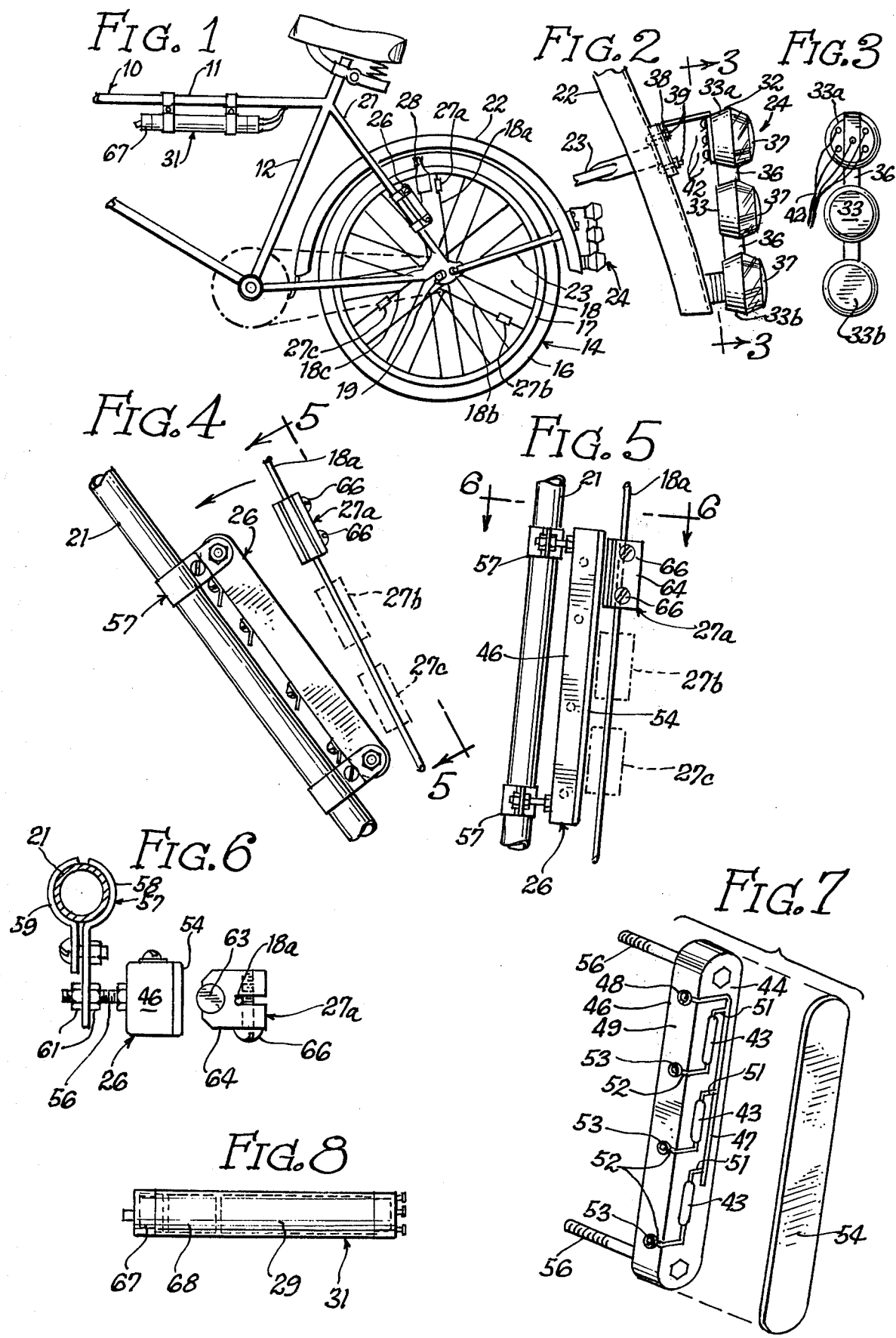

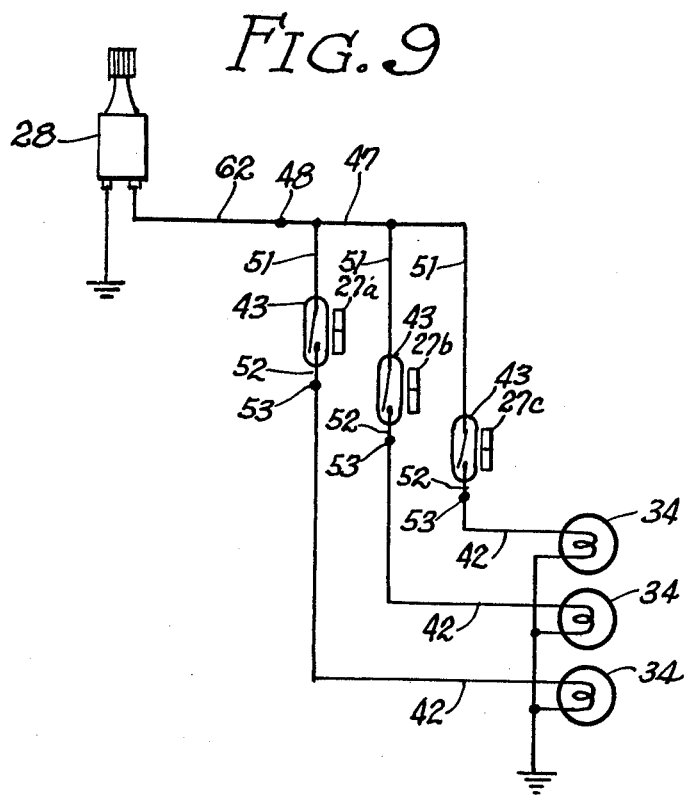

SAFETY LIGHTING SYSTEM

BACKGROUND OF THE INVENTION

The present invention relates to an improved velocity responsive lighting system which provides for the periodic energizing of a plurality of warning lights in sequence for a period determined by the velocity of the vehicle. More particularly, the present invention relates to a lighting system having a plurality of warning lights controlled by a plurality of magnetically responsive switch means and a plurality of magnetic field generating means, both of which are mounted on the vehicle so that one plurality passes in the vicinity of the other to periodically actuate the switch means causing the warning lights to be energized in sequence.

Vehicle lighting systems, particularly for bicycles, operable from batteries or a small generator operable with the rim or tire of a bicycle are known in the art. These known lighting systems usually include a rearwardly illuminating warning or tail light to indicate the presence of the vehicle to following vehicles. In darkness, the tail or warning light is effective to indicate to following vehicles that some object, either moving or stationary, lies ahead or in the path of the following vehicle. Unless the forwardly illuminating lighting system of the following vehicle can illuminate the vehicle having the tail or warning light, or unless the vehicle having the warning light is moving in an erratic path, the following vehicle may not be able to readily determine whether the vehicle ahead is in fact moving, and if so, the relative velocity of that vehicle. In many instances, particularly where the following vehicle is travelling at a high velocity with respect to the vehicle ahead, a constant warning light is insufficient to provide adequate time to stop the following vehicle upon the operator determining that the vehicle ahead is not moving or is moving at a slower velocity relative to the velocity of the following vehicle.

Attempts have been made to alleviate the failure of the tail or warning right to indicate whether a vehicle has been halted or, if moving, to indicate the relative speed of the vehicle. In each attempt known to me, a contact switch device employing a disc adjacent the hub of a wheel or mounted on the spokes of a wheel acts in conjunction with one or more wipers to form a periodic or interrupting switch, or a star wheel is mounted to be rotated by the spokes of a wheel and attached to a rotary switch, to cause one or two rearwardly illuminating lamps to flash in accordance with the velocity of the vehicle. These known attempts at solving the problem soon become useless as the wipers or other contacting parts become worn, or the spokes or other parts of the vehicle utilized for the switching mechanisms become misaligned from wear, vibration or rough use of the vehicle. Particularly in the installation of the known devices in cycles, especially bicycles, the area in which the spokes and hubs or axles of the wheels are located are subjected to dust, mud and other contact-fouling elements which frequently result in erratic functioning or failure of a contact or wiping switch assembly. Hence, under conditions where warning lights are most needed, the switching arrangements of the known attempts are most likely to fail.

BRIEF SUMMARY OF THE INVENTION

Therefore, one object of the present invention is the provision of a velocity responsive lighting system for a vehicle which causes a plurality of light means to be energized in sequence for a period determined by the velocity of the vehicle without the use of wiping contacts or contact between non-moving elements and elements moving at a velocity related to the velocity of the vehicle.

Another object of this invention is the provision of a velocity responsive lighting system in which a plurality of lighting means are periodically energized in sequence for a period determined by the velocity of the vehicle which is resistent to the effects of corrosion, misalignment and fouling.

Still another object of this invention is the provision of a flashing tail light system for bicycles which utilizes a plurality of sealed switch components and a plurality of spoke-mounted magnets to cause a plurality of tail lights to flash in sequence in accordance with the velocity of a wheel of the bicycle.

Further objects and advantages of this invention will become apparent from the following description when the same is considered in connection with the accompanying drawing.

In accordance with the present invention there is provided an improved velocity responsive lighting system for a vehicle having a plurality of warning light means mounted on the vehicle, a plurality of magnetically responsive switch means mounted on the vehicle and operatively coupled to the warning light means, and a plurality of magnetic field generating mounted on the vehicle. One of either the plurality of magnetically responsive switch means or the plurality of magnetic field generating means is mounted on a rotatable member of the vehicle and the other is mounted adjacent thereto so that upon rotation of the rotatable member each of the light means is periodically energized in sequence for a period determined by the velocity of the rotatable member. The mounting of one of either of the plurality of switch means or the plurality of magnetic field generating means on the rotatable member with the other being mounted adjacent thereto provides that upon rotation of the rotatable member, each of the plurality of magnetic field generating means is placed within the vicinity of one of the magnetically responsive switch means to cause the latter to be energized for the period during which the corresponding magnetic field generating means remains within the vicinity of that magnetically responsive switch means. Each of the magnetically responsive switch means are operatively coupled to one of the plurality of warning light means so that each warning light means is energized during the period in which the corresponding magnetic field generating means is within the vicinity of the corresponding switch means. In this manner, the plurality of warning light means will be illuminated, i.e. flashed, in sequence for a period determined by the velocity of the rotatable member of the vehicle without the use of open contacts or wipers or rotary switches which are readily fouled and frequently fail due to even minor misalignment.

The safety lighting system of the present invention can include battery means for energizing the light means, preferably with means to increase the energy supplied to the light means, wherein the battery means and the means to increase the energy supplied to the light means are mounted on the vehicle and are operatively connected to the plurality of magnetically responsive switch means and the plurality of light means. The lighting system can alternatively include electrical current generating means for energizing the light means wherein the electrical current generating means is similarly mounted on the vehicle and operatively connected to the plurality of magnetically responsive switch means and the plurality of light means. Electrical current generating means for vehicles, particularly for cycles, are known to the art and will hereinafter be termed as a generator for brevity. Where the vehicle with which the lighting system of the present invention is to be utilized is a cycle, the generator can be mounted on a supporting member of the vehicle adjacent a rotatable member, particularly the rim of a wheel or the tire of a vehicle. The generator can be selectively switchable between an operating mode and an inoperable mode with respect to the rotatable member of the vehicle.

It is further contemplated that the lighting system of the present invention can include both battery means and generator together with circuit means for alternatively controlling the energizing of the light means by the battery means and generator responsive to the velocity of the vehicle. In this manner, the plurality of lighting means can be energized efficiently and economically by the generator when the vehicle is moving with sufficient velocity to generate the electrical current required by the light means, while at lower velocities where insufficient electrical current would be generated by the generator, the battery means is utilized to energize the light means. In this manner the light means will be efficiently and economically energized over the entire range of velocities of the vehicle, and in addition, by modifying the circuit means as will be hereinafter described, the battery means can be utilized to energize at least one of the light means when the vehicle is stopped. Preferred circuit means to accomplish the efficient utilization of both battery means and generator is disclosed in the copending application of Alan M. Bloomfield, Ser. No. 434,997, filed Jan. 21, 1974, now U.S. Pat. No. 3,894,281, issued July 8, 1975, which description is incorporated herein. In particular, reference is made to FIG. 3 of the copending application wherein the system includes a tail light 38 with lamps 61 and 62 alternatively energized by the generator and battery, respectively. In utilizing the circuit of FIG. 3 of the copending application in the present invention, it is contemplated that the present plurality of light means and the plurality of magnetically responsive switch means coupled thereto can be substituted for either or both of lamps 43 and 61 and that a lamp similar to lamp 62 can be included in at least one of the light means to provide continuous illumination when the vehicle is moving at or below a predetermined minimum velocity or is stopped. In addition, it is contemplated that the battery means and solid state circuit means may be packaged differently than shown in the copending application and mounted on another portion of the vehicle as will be hereinafter shown.

The lighting system of the present invention is preferably installed with the plurality of magnetic field generating means mounted along at least one radius of a rotatable member of the vehicle with each of these means being radially spaced from the center of the member. Even more preferably, each of the magnetic field generating means are radially and angularly spaced along radii of the rotatable member. Where the rotatable member is spoked, such as the wheel of a cycle, the plurality of magnetic field generating means are preferably mounted in radially and angularly spaced relationship on spokes of the wheel. In conjunction with the most preferrred installation of the magnetic field generating means of the system, particularly where the rotatable member is spoked and is journalled for rotation in a supporting member which extends in a plane adjacent the rotatable member substantially from the axis of the center of the member, the plurality of magnetically responsive switch means are preferably radially mounted on that supporting member, most preferably with individual switch means being spaced radially a distance substantially corresponding to the distance of one each of the plurality of magnetic field generating means from the axis of the rotatable member.

The lighting system described above is particularly adapted for use on cycles, especially for use on lightweight, non-motorized cycles, such as bicycles. The lighting system is especially useful as a rearward warning or tail light system to following vehicles to indicate that the cycle is moving and to provide an indication of the velocity of the cycle. The indication is given by the illumination of a plurality of light means in sequence for a period determined by the velocity of the vehicle. The resulting blinking or flashing of the plurality of light means provides an illusion of motion to the operator of following vehicles. The lighting system of the present invention is particularly advantageous since exposed, wiping or rotating contacts, such as those found in prior art apparatus, which are subject to fouling and failure upon misalignment have been eliminated. In the present invention magnetically responsive switch means, such as magnetic reed switches, which are usually sealed and can be mounted in protective housings, are free from corosion and fouling by elements encountered in normal use of the vehicle, such as rain, snow, dust, mud, and the like, and are free from failure due to minor misalignments often encountered in the use of such vehicles.

BRIEF DESCRIPTION OF THE DRAWING

FIG. 1 is a fragmentary side view of an embodiment of the present invention mounted on a bicycle frame.

FIG. 2 is a fragmentary side view on an enlarged scale, of the taillight, fender and supporting strut shown in FIG. 1.

FIG. 3 is a cross-sectional view taken substantially on line 3—3 of FIG. 2.

FIG. 4 is a fragmentary side view, on an enlarged scale, of the magnetically responsive switch housing, supporting member, a spoke and magnetic field generating means shown in FIG. 1.

FIG. 5 is a right side view taken substantially on line 5—5 of FIG. 4.

FIG. 6 is a cross-sectional view taken substantially on line 6—6 of FIG. 5.

FIG. 7 is an exploded, perspective view, on an enlarged scale, of the magnetically responsive switch means assembly shown in FIGS. 1, 4 and 5.

FIG. 8 is a partially schematic side view of the switch, battery and solid state circuit housing of one embodiment of the present invention as shown in FIG. 1.

FIG. 9 is a schematic circuit diagram illustrating one embodiment of the present invention.

BRIEF DESCRIPTION OF PREFERRED EMBODIMENTS

In the particular construction shown in FIG. 1 of the drawing, the numeral 10 indicates, generally, a bicycle frame typical of bicycle frames on which the lighting system of the present invention is especially adapted to be mounted. Frame 10 includes a horizontal member 11 which serves to connect a steering post (not shown) with a seat post member 12. Frame 10 supports a spoked rear wheel and tire assembly 14, including a rear tire 16 mounted on a wheel rim 17 and supported by a plurality of spokes 18 which are further attached to a hub or axle 19, journalled between a pair of struts 21 which extend downwardly and rearwardly from seat post member 12. As further shown in FIG. 1, a rear fender 22 at least partially covers the upper portion of tire 16 and is attached to frame 10 at several points and by means of a pair of supporting struts 23. Several other portions or components of the bicycle are shown in FIG. 1, but since they are not essential to the description or understanding of the present invention reference thereto.

As shown in FIG. 1, the embodiment of the system of the present invention thereshown includes a a light means assembly 24, a magnetically responsive switch assembly 26 and a plurality of magnet assemblies 27a, 27b, and 27c. Light means assembly 24 and magnetically responsive switch assembly 26 are operatively coupled and together with either or both of a generator 28 or at least one battery 29 (shown within battery, switch and circuit assembly 31) with means to increase the supply of energy if a battery alone is employed (as will be hereinafter described) provide the rearward periodic, sequential illumination of the present invention.

Light means assembly 24 consists of a base 32 having three cup-shaped portions 33 in which lamps 34 (FIG. 9) can be mounted, and interconnecting portions 36 which rigidly interconnect portions 33 and support conductors (not shown) which extend between the lamps 34. The cup-rim margin of cup-shaped portions 33 support red colored lenses 37, preferably in a waterproof relation. Base 32 is secured to fender 22 by a generally U-shaped bracket 38 bolted to fender 22 by nuts and bolts 39 and to the upper portion 33a of base 32 by welding or fasteners (not shown). Base 32 is also affixed to fender 22 at its lower cup-shaped portion 33b by a spacer 41, which can be a tube, a rod, a stack of washers, and the like, which may be bolted or welded to both fender 22 and lower base portion 33b. Insulated conductors 42 extend from the rear of base portion 32, such as from upper cup-shaped portion 33a, as shown, and extend along either a supporting strut 23 or fender 22, and supporting member 21 to magnetically responsive switch assembly 26.

Magnetically responsive switch assembly 26, as more particularly shown in FIGS. 4, 5 and 7, includes a plurality of generally tubular magnetic field responsive reed switches 43 disposed in individual axially aligned, spaced cavities in one face 44 of a generally rectangular insulating body 46. Body 46 is preferably formed of resinous insulating material, such as acrylic resin. As schematically shown in FIG. 9, reed switches 43, which are commercially available consist of a glass or other insulating envelope in which a magnetically deflectable reed is supported between conductive terminals mounted at the ends of the envelope. A common conductor 47 is disposed in a channel in face 44 of insulating body 46 which is substantially parallel to switches 43 and terminates in a terminal 48 on another face 49 of body 46 which is adjacent to face 44. Assembly 26 further includes conductors 51 for each of switches 43 which interconnect one terminal of the switch and common conductor 47. Conductors 51 are disposed in channels in face 44 of insulating body 46. A second connector 52 for each of the switches 43 are connected to the other terminal of each switch and terminate at individual terminals 53 on face 49 of body 46. Face 44 of insulating body 46 is covered by a substantially flat electrically insulating cover 54 is affixed thereto preferably so as to exclude, moisture or dust particles such as by sealing the edges thereof abuting body 46. Assembly 26 is provided with means for mounting the assembly on the vehicle, such as studs or bolts 56 extending from a third face of body 46 opposite to face 44 thereof. Magnetically responsive switch assembly 26 is mounted on strut 21 by means of a pair of brackets 57 which are shown in detail in FIG. 6. Bracket 57 consists of a first member 58 and a cooperating second member 59 which at one end substantially surround member 21 and at the other are bolted together and receive a bolt 56 of assembly 26. Suitable fasteners, such as nuts 61 adjustably secure bolts 56 to brackets 57. In this manner, switch assembly 26 can be supported on member 21 in parallel relation to the supporting member in a plane adjacent and substantially parallel to the rotational path of spokes 18. In accordance with FIG. 9, terminals 53 of assembly 26 receive one end of conductors 42 where the opposite ends of these conductors are connected to lamps 34. Attached to terminal 48, and hence to common conductor 47, of assembly 26 is still another insulated conductor 62 which is connected at its other end to one terminal of either generator 28, battery 29 or one terminal of battery, switch and circuit assembly 31.

In the system of the present invention, the reed switches 43 in assembly 26 are deflected to a closed condition by one of a plurality of magnet assemblies 27a, 27b, 27c, being placed within magnetic field response proximity of a switch. In the embodiments shown in the drawings, the assemblies consist of a rod magnet 63 rigidly supported in a housing 64 which is clamped to one of the plurality of spokes 18 by at least one bolt 66 passing through one side of an end of housing 64 which has a U-shaped opening to receive the spoke, and passes into the other, threaded side of that end of housing 64. Each of the magnet assemblies 27a, 27b, and 27c are radially spaced from the center of wheel and tire assembly 14, and preferably are radially and angularly spaced along radii of the wheel, i.e., radially spaced along spokes 18a, 18b, and 18c of the plurality of spokes 18 which are equi-angularly spaced from each other. As particularly shown in FIGS. 4 and 5, magnet assemblies 27a, 27b, and 27c are each spaced radially along the corresponding spokes at a distance substantially corresponding to the distance of one each of the plurality of switches 43 along supporting member 21 from the hub or axle 19 substantially at the center of wheel and tire assembly 14. As heretofore noted, upon rotation of wheel and tire assembly 14, each bar magnet 63 of magnet assemblies 27a, 27b, and 27c passes within magnetic field response proximity of one of the magnetically responsive reed switches 43 in sequence, deflecting the reed therein to a conducting position thereby completing a circuit and energizing the corresponding lamp 34 within light assembly 24 for the period during which the magnet assembly remains within magnetic field response proximity of the reed switch. It will be understood that the periods of illumination of each of lamps 34 will increase in frequency and decrease in duration in relation to increase in velocity of the rotation of tire and wheel assembly 14 thereby providing a more rapid flashing of the lamps as the velocity of the vehicle increases, and conversely the frequency will decrease and the duration of illumination increase as the vehicle slows.

In its simplest embodiment, as shown in FIG. 9, lamps 34 are energized by generator 28 by having conductor 62 connected directly from terminal 48, and hence to common conductor 47, of switch assembly 26 to one terminal of generator 28 while the other terminal thereof is connected to ground. Since one lead of each of lamps 34 is also connected to ground, a circuit is completed to energize each of the lamps whenever the generator is operating and the particular reed switch 43 is closed by the corresponding magnet assembly being in magnetic field responsive proximity to the switch. As shown in the copending application of Alan M. Bloomfield, Ser. No. 434,997, filed Jan. 21, 1974 now U.S. Pat. No. 3,894,281, issued July 8, 1975, generator 28 can include a mechanical position switch which permits the generator to be selectively switchable between an operating mode with respect to tire 16 and an inoperable mode with respect to the tire. Hence, in its simplest form, as shown in FIG. 9, the present invention need include only the light assembly 24, the magnet assemblies 27a, 27b, and 27c, the magnetically responsive switch assembly 26 and a generator 28, together with connecting conductors, to achieve desired warning light illumination. In another embodiment of the present invention in simplified form, a battery 29, such as in assembly 31, with switch 67, can be utilized instead of generator 28 to accomplish the desired result of this invention. However, I have found at relatively high velocities the energy supplied by battery 29 is insufficient to energize lamps 34 during the short duration magnet assemblies 27a, 27b, and 27c are within magnetic field response proximity of reed switches 43. Therefore, I prefer to utilize means for increasing the energy supplied by the battery 29, for example, by operatively coupling to the battery a capacitor (not shown) or an equivalent circuit for providing brief bursts of energy to lamps 34 as released by reed switches 43. The use of capacitors and capacitance type circuits for this purpose is known in the art. The operation of lamps 34 energized by battery 29 with or without a capacitor or a capacitance type circuit is identical to that described for operation with generator 28 after switch 67 is placed in the on position.

As heretofore, described, an improved system is obtained by utilizing both generator 28 and battery, switch and circuit assembly 31 wired as shown in the previously cited copending application now U.S. Pat. No. 3,984,281 of Alan M. Bloomfield with the substitution of a plurality of lamps 34 and a magnetically responsive reed switch connected in one lead of each of the lamps for one or more of the lamps 43, 49, 61 and 62 of the cited application now U.S. Pat. No. 3,894,281 of Alan M. Bloomfield. In addition, generally tubular assembly 31 shown in detail in FIG. 8 herein includes a switch 67, one or more batteries 29 and a solid state circuit 68 which corresponds to identical items in the cited copending application. The utilization of the circuit means disclosed in the cited copending application in the lighting system of the present invention provides a lighting system wherein a plurality of light means are periodically energized in sequence for a period determined by the velocity of the vehicle in a highly efficient and economical manner wherein the light means are energized by a generator when the velocity of the vehicle is above a predetermined velocity and is energized by battery means when the vehicle is stopped or moving at a velocity less than the predetermined velocity under which condition the generator would not generate sufficient electricity to adequately energize the light means. In addition, a lamp (not shown) may be incorporated into light means assembly 24, for example in the center cupped-shaped portion 33, and connected as shown for lamps 49 or 62 in the cited copending application to thereby provide constant illumination in the system of the present invention whenever the vehicle is stopped. While the present invention has been described utilizing generator 28 and/or battery 29 in conjunction with rear or taillights only, it is contemplated that these same sources of energy can be utilized to energize other accessories, such as a head lamp, a horn or a radio.

Various changes coming within the spirit of my invention may suggest themselves to those skilled in the art; hence I do not wish to be limited to the specific embodiments shown and described or uses mentioned, but intend the same to be merely exemplary, the scope of my invention being limited only by the appended claims.

I claim:
1. An improved speed responsive lighting system for a cycle having a spoked wheel rotatable at a velocity relative to the speed of the cycle, said wheel being journalled for rotation in a supporting member of said cycle which is disposed in a plane adjacent to the spokes of the wheel and which extends substantially radially from the center of the wheel, said system comprising:
   a. a plurality of warning light means mounted in a unitary bracket mounted on said cycle with the light means being rearwardly directed,
   b. a plurality of magnetically responsive switch means mounted in aligned relationship in an integral housing with said housing being mounted on said cycle in parallel relation to said supporting member adjacent a plurality of spokes of said wheel and being operatively coupled to said warning light means,
   c. and a plurality of magnetic field generating means mounted on equiangularly spaced spokes of said wheel,
   d. each of said magnetic field generating means being spaced radially from the center of the wheel a distance corresponding to the distance of a respective one of each of the magnetically responsive switch means from the center of the wheel whereby upon rotation of the wheel each of the magnetic field generating means passes within magnetic field responsive proximity of one of said magnetically responsive switch means to cause the latter to be actuated and thereby to cause each of said light means to be periodically energized in sequence for an interval determined by the velocity of rotation of said wheel.

* * * * *